United States Patent
Kizaki et al.

(10) Patent No.: US 10,748,225 B2
(45) Date of Patent: Aug. 18, 2020

(54) CONTROL DEVICE, CONTROL METHOD, AND COMPUTER-READABLE RECORDING MEDIUM

(71) Applicants: FUJITSU LIMITED, Kawasaki-shi, Kanagawa (JP); FUJITSU FIP CORPORATION, Minato-ku, Tokyo (JP)

(72) Inventors: Yoshio Kizaki, Saitama (JP); Masanori Kimura, Mishima (JP)

(73) Assignee: FUJITSU LIMITED, Kawasaki (JP)

( * ) Notice: Subject to any disclaimer, the term of this patent is extended or adjusted under 35 U.S.C. 154(b) by 505 days.

(21) Appl. No.: 15/246,792

(22) Filed: Aug. 25, 2016

(65) Prior Publication Data
US 2017/0083994 A1 Mar. 23, 2017

(30) Foreign Application Priority Data
Sep. 18, 2015 (JP) .................... 2015-186006

(51) Int. Cl.
*G06Q 50/18* (2012.01)
*G06Q 50/26* (2012.01)

(52) U.S. Cl.
CPC .......... *G06Q 50/18* (2013.01); *G06Q 50/26* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,799,243 B1* | 8/2014 | Havlik | ............... | G06Q 10/0631 707/694 |
| 2005/0010734 A1 | 1/2005 | Soejima et al. | | |
| 2005/0071180 A1* | 3/2005 | Richman | ................ | G06Q 10/10 726/7 |
| 2005/0081151 A1* | 4/2005 | Van Der Meer | ....... | G06Q 50/30 715/700 |
| 2007/0056018 A1* | 3/2007 | Ridlon | ................... | G06F 21/604 726/1 |
| 2007/0240223 A1* | 10/2007 | Zpevak | ................. | G06F 21/577 726/25 |
| 2009/0164520 A1* | 6/2009 | Schulz | .................... | G06Q 10/10 |
| 2011/0218928 A1* | 9/2011 | Refior | .................. | G06Q 50/184 705/310 |
| 2016/0132896 A1* | 5/2016 | Guerin | ................. | G06Q 30/018 705/317 |

FOREIGN PATENT DOCUMENTS

| | | |
|---|---|---|
| JP | 2003-203158 | 7/2003 |
| JP | 2003-323376 | 11/2003 |
| JP | 2005-31834 | 2/2005 |
| JP | 2014-35655 | 2/2014 |

* cited by examiner

*Primary Examiner* — Mark A Fleischer
(74) *Attorney, Agent, or Firm* — Xsensus LLP

(57) ABSTRACT

A control server controls an operator who provides an operational service on an operating system based on export control regulations. The control server stores therein operator information related to the operator and control information including a determination date that is a date when provision of the operational service is determined to comply with the export control regulations. The control server selects an operator who does not fall under the export control regulations, out of the operators, as an operator who provides the operational service, based on the control information and an effective date that is a date when the latest export control regulations become effective.

10 Claims, 15 Drawing Sheets

FIG.3

| TEAM ID | OPERATING SYSTEM | DETERMINA-TION DATE |
|---|---|---|
| G01 | A01 | 2015.3.1 |
| G02 | A01 | 2015.3.1 |
| G05 | B01 | 2014.10.1 |
| ... | ... | ... |

FIG.4

| DC ID | DC NAME | LOCATION COUNTRY |
|---|---|---|
| DC01 | FUJI DC | JAPAN |
| DC02 | US DC | US |
| DC03 | CHUBU DC | JAPAN |
| ... | ... | ... |

FIG.5

| TEAM ID | TEAM NAME | BUSINESS HOURS OPERATION | TEAM'S DC | MEMBER CHANGE DATE |
|---|---|---|---|---|
| G01 | JAPAN A1 | 9:00 TO 17:00 (JST) | DC01 | 2015.4.1 |
| G02 | JAPAN A2 | 9:00 TO 17:00 (JST) | DC01 | 2014.12.1 |
| G03 | JAPAN B1 | 12:00 TO 20:00 (JST) | DC01 | 2012.5.1 |
| G04 | JAPAN B2 | 12:00 TO 20:00 (JST) | DC01 | 2014.10.1 |
| G05 | US A1 | 8:00 TO 18:00 (PST) | DC02 | 2014.2.1 |
| ... | ... | ... | ... | ... |

FIG.6

| OPERATOR ID | NAME | CONTACT INFORMATION | OPERATOR'S TEAM | EXPORT CONTROL RELATED ITEMS ||||| EXPORT CONTROL RELATED ITEMS CHANGE DATE | TEAM CHANGE DATE |
| | | | | OPERATOR'S COMPANY | HAVING LIVED IN JAPAN FOR 6 OR MORE MONTHS | NATIONALITY | ... | | |
| T01 | TARO TANAKA | tanaka@xx.xx | G01 | C01 | YES | JAPAN | ... | 2015.4.1 | 2015.4.1 |
| T02 | JOHN DOE | doe@yy.yy | G05 | C06 | NO | US | ... | 2012.5.1 | 2013.10.1 |
| T03 | HANAKO YAMADA | yamada@zz.zz | G03 | C03 | NO | JAPAN | ... | 2015.2.1 | 2011.6.1 |
| ... | ... | ... | ... | ... | ... | ... | ... | ... | ... |

FIG.7

| COMPANY ID | COMPANY NAME | LOCATION COUNTRY |
|---|---|---|
| C01 | COMPANY X | JAPAN |
| C02 | JAPAN BRANCH OF COMPNAY M | JAPAN |
| C03 | COMPANY N | JAPAN |
| C04 | COMPNAY P | US |
| C05 | HEAD OFFICE OF COMPANY M | UK |
| C06 | COMPANY Q | US |
| ... | ... | ... |

FIG.8

| SYSTEM ID | OPERATING SYSTEM NAME | DC IN USE | MINIMUM NUMBER OF OPERATORS |
|---|---|---|---|
| A01 | COMPANY A | DC01 | 10 |
| B01 | COMPANY B | DC02 | 8 |
| C01 | COMPANY C PERSONNEL SYSTEM | DC01 | 5 |
| C02 | COMPANY C DESIGN SYSTEM | DC01 | 15 |
| ... | ... | ... | ... |

FIG.9

| EFFECTIVE DATE | COUNTRY | CHANGED REGULATION INFORMATION, ETC. |
|---|---|---|
| 2012.5.1 | JAPAN | CHANGE IN CLASSIFICATION CRITERIA |
| 2011.3.4 | JAPAN | REVISION ON FOREIGN USER LIST |
| 2010.1.1 | JAPAN | CHANGE IN CLASSIFICATION CRITERIA |
| 2011.10.2 | US | ... |
| ... | ... | ... |

FIG.10

| COUNTRY | EXPORT CONTROL RELATED ITEMS | DETERMINATION CRITERIA | DETERMINATION LEVEL |
|---|---|---|---|
| JAPAN | HAVING LIVED IN JAPAN FOR 6 OR MORE MONTHS | YES | L1 |
| JAPAN | OPERATOR'S COMPNAY | OFFICE IN JAPAN | L1 |
| JAPAN | OPERATOR'S COMPNAY | NOT REGISTERED IN FOREIGN USER LIST | L2 |
| US | US CITIZEN | YES | L1 |
| US | US PERMANENT RESIDENT | YES | L1 |
| US | NATIONALITY | ... | L2 |
| US | BIRTH COUNTRY | ... | L2 |
| ... | ... | ... | ... |

FIG.11

| EXECUTION DATE AND TIME | TARGET SYSTEM | ORIGIN OF EXPORT (COUNTRY) | EXPORT DESTINATION (COUNTRY) | OPERA-TION TEAM | LIST OF WORKING OPERATORS IN TEAM | COMPLIANCE ASSESSEMNT |
|---|---|---|---|---|---|---|
| 2015.1.2 02:00 (JST) | A01 | JAPAN | US | G05 | JOHN DOE, … | NO |
| 2015.1.2 10:00 (JST) | A01 | JAPAN | JAPAN | G01 | TARO TANAKA, … | ASSESSED COMPLIANCE 1 |
| 2015.1.1 14:00 (PST) | B01 | US | CHINA | G08 | … | ASSESSED COMPLIANCE 2 |
| … | … | … | … | … | … | … |

FIG.12

| EXECUTION DATE AND TIME | TARGET SYSTEM | ORIGIN OF EXPORT (COUNTRY) | EXPORT DESTINATION (COUNTRY) | TEAM SCHEDULED TO OPERATE | OPERATION TEAM | LIST OF WORKING OPERATORS IN TEAM | MEMBER CHANGE DATE | DETERMINATION DATE | EFFECTIVE DATE OF LATEST REGULATIONS |
|---|---|---|---|---|---|---|---|---|---|
| 2015.1.2 02:00 (JST) | A01 | JAPAN | US | G05 | G05 | JOHN DOE, ... | 2014.2.1 | 2014.10.1 | 2012.5.1 |
| 2015.1.2 10:00 (JST) | A01 | JAPAN | JAPAN | G08 | G01 | TARO TANAKA, ... | 2015.4.1 | 2015.3.1 | 2012.5.1 |
| 2015.1.1 14:00 (PST) | B01 | US | CHINA | G08 | G08 | ... | 2015.3.1 | 2014.10.1 | 2011.10.2 |
| ... | ... | ... | ... | ... | ... | ... | ... | ... | ... |

CONTROL DEVICE, CONTROL METHOD, AND COMPUTER-READABLE RECORDING MEDIUM

CROSS-REFERENCE TO RELATED APPLICATION

This application is based upon and claims the benefit of priority of the prior Japanese Patent Application No. 2015-186006, filed on Sep. 18, 2015, the entire contents of which are incorporated herein by reference.

FIELD

The embodiments discussed herein are related to a control device, a control method, and a computer-readable recording medium.

BACKGROUND

In recent years, with the spread of virtual machines and the like, outsourcing services that provide services by using a plurality of data centers regardless of the region or country, have been growing. For example, the outsourcing services equally provide service management, operations, service platforms, facilities, and networks, under a unified concept and standardized service management, without geographical or physical restrictions.

In such outsourcing services, the data centers are managed by a control center. For example, the control center assigns an operation team for remotely operating the customer system using the outsourcing services. Conventional examples are described in Japanese Laid-open Patent Publication No. 2014-035655, Japanese Laid-open Patent Publication No. 2005-031834, Japanese Laid-open Patent Publication No. 2003-203158, and Japanese Laid-open Patent Publication No. 2003-323376.

However, with the technologies described above, it is not possible to control the export of remote operations. For example, operation of an application screen used for monitoring the system or the like is regarded as a transfer of technology, and falls under the recent export control regulations. The export control regulations are an international framework for restricting the export of weapons as well as goods and technologies with possible military applications. Exports are controlled by the laws in each country, based on the contents of goods and technologies to be exported, and the region or country of export destination and the export destination (consumer). For example, in Japan, to decide the need of an application for export permission based on the Foreign Exchange and Foreign Trade Act, the classification criteria are defined so as to check the usage based on the content of export. In the U.S., the Export Administration Regulations (EAR) controls the export. Thus, the contents of the export control regulations change according to the region where the data center is established, the nationality of the operator who provides remote operation, and the like. In this manner, it is not easy to control the export of remote operations. Also, the services such as the remote operations are provided continuously or intermittently during a long period of time. Hence, it is important to comply with the export control regulations (i.e. export regulations) while suitably corresponding to the revisions of the export control regulations and the change in members of the remote operation team, during the period the service is provided.

SUMMARY

According to an aspect of an embodiment, a control device includes a memory that stores therein operator information related to operators who provide an operational service on an operating system and control information including a determination date that is a date when provision of the operational service is determined to comply with an export control regulation; and a processor that is connected to the memory, wherein the processor executes a process. The process includes referring the operator information and the control information which are stored in the memory, and selecting an operator who does not fall under the export control regulation out of the operators, as an operator who provides the operational service, based on the control information and an effective date that is a date when the latest export control regulation becomes effective.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of information stored in an export control table;

FIG. 4 is a diagram illustrating an example of information stored in a DC table;

FIG. 5 is a diagram illustrating an example of information stored in an operation team table;

FIG. 6 is a diagram illustrating an example of information stored in an operator table;

FIG. 7 is a diagram illustrating an example of information stored in a company table;

FIG. 8 is a diagram illustrating an example of information stored in an operating system table;

FIG. 9 is a diagram illustrating an example of information stored in a regulatory update information table;

FIG. 10 is a diagram illustrating an example of information stored in an export control related items table;

FIG. 11 is a diagram illustrating an example of history information stored in an execution record table;

FIG. 12 is a diagram illustrating another example of history information stored in the execution record table;

DESCRIPTION OF EMBODIMENTS

Preferred embodiments of the present invention will be explained with reference to accompanying drawings. It is to be noted that the present invention is not limited to the embodiments.

[a] First Embodiment

Overall Configuration

Figure 1:
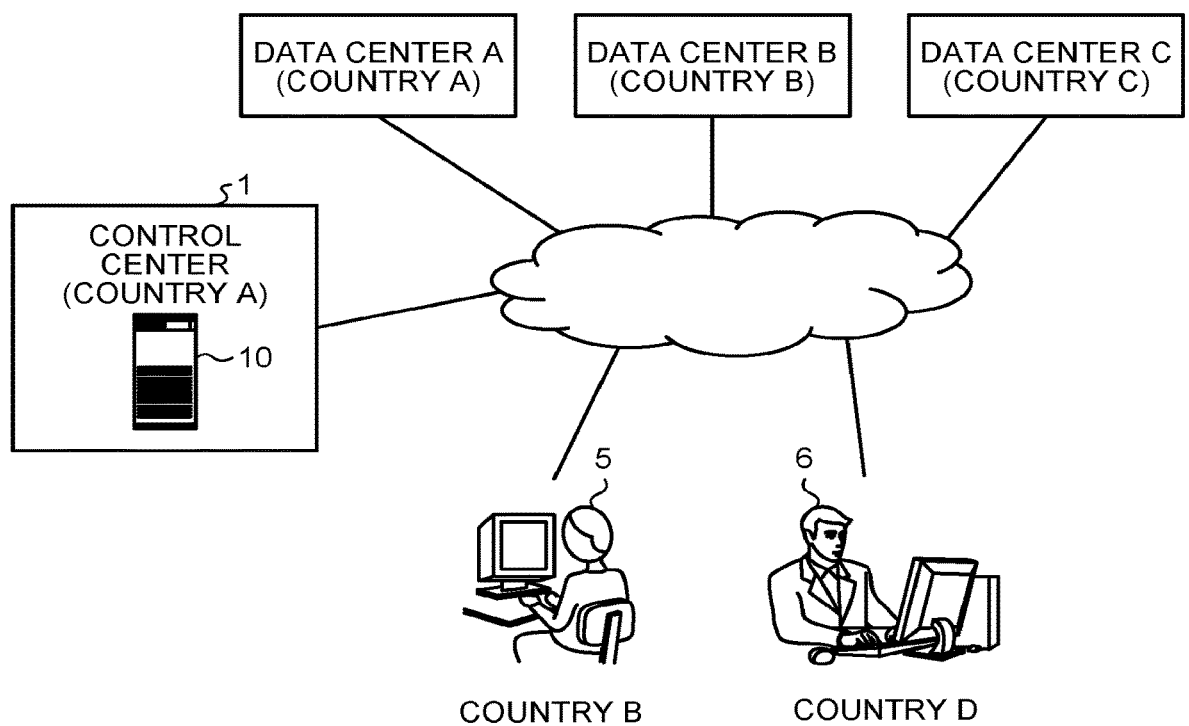
FIG. 1 is a diagram illustrating an example of the overall configuration of a system according to a first embodiment.

FIG. 1 is a diagram illustrating an example of the overall configuration of a system according to a first embodiment. As illustrated in FIG. 1, the system includes a control center 1, a data center A, a data center B, and a data center C. The system also includes an operation team 5 and an operation team 6 as operation teams including one or a plurality of operators who operates a customer system provided by each of the data centers.

Each of the data centers (hereinafter, may be referred to as a DC) includes a physical server. The data centers provide various server functions such as a Web server, a database (DB) server, and an application (AP) server, with a physical server or a virtual machine. The data centers also provide an operational system. The control center 1 includes a control server 10, and the control center 1 is a data center that controls information on data centers and information on customers who use the data centers.

The data center A is located in a country A, the data center B is located in a country B, and the data center C is located in a country C. The control center 1 is located in the country A. In other words, in the example illustrated in FIG. 1, the data center A and the control center 1 are located in the same country, and the other data centers are located in other countries. The operation team 5 conducts remote operation from the country B, and the operation team 6 conducts remote operation from a country D.

An example of a process performed by the control server 10 of the control center 1 in such an operation mode will now be described. The control server 10 includes a storage unit that stores therein operator information related to an operator who provides operational services such as monitoring, operating, controlling, or maintaining for the operating system, and control information including a determination date that is a date when the provision of the operational service is determined to comply with the export control regulations. The control server 10 selects the operator information that complies with the export control regulations, based on the control information and an effective date that is a date when the latest export control regulations become effective.

For example, the control server 10 selects an operation team so that the transmission of information related to remote operation from the base of the operating system to the operator in the operation team does not fall under the export control regulations, by using the information stored in the storage unit. For example, if there is a change in the export control regulations, the control server 10 determines the operation team that remotely operates the operating system, by making comparison between the above-described determination date of the operation team and the change date of the export control regulations, associated with the operating system. More specifically, if the determination date is before the change date, the control server 10 reselects the operation team so that the transmission of information related to remote operation, from the base of the operating system to the operator in the operation team, does not fall under the export control regulations.

The control server 10 also controls changed information of a member change date that is a date when a change such as an operator is added to or removed from the operation team is either made or set. The control server 10 further controls changed information of a date when a change is either made or set in the operation team to which the operators belong. To select an operator who provides an operational service such as monitoring out of the operators in the operation team, the control server 10 can exclude an operator who has not been included in a determination target when the compliance determination with respect to the export control regulations is made based on the changed information.

The process of selecting the operation team or operator for controlling the export, for example, is performed at the time when an operation work is planned or when the plan is confirmed every month, every week, or every day. The manager of the control center may also select the operation team or operator at any time as needed.

Functional Configuration

Figure 2:
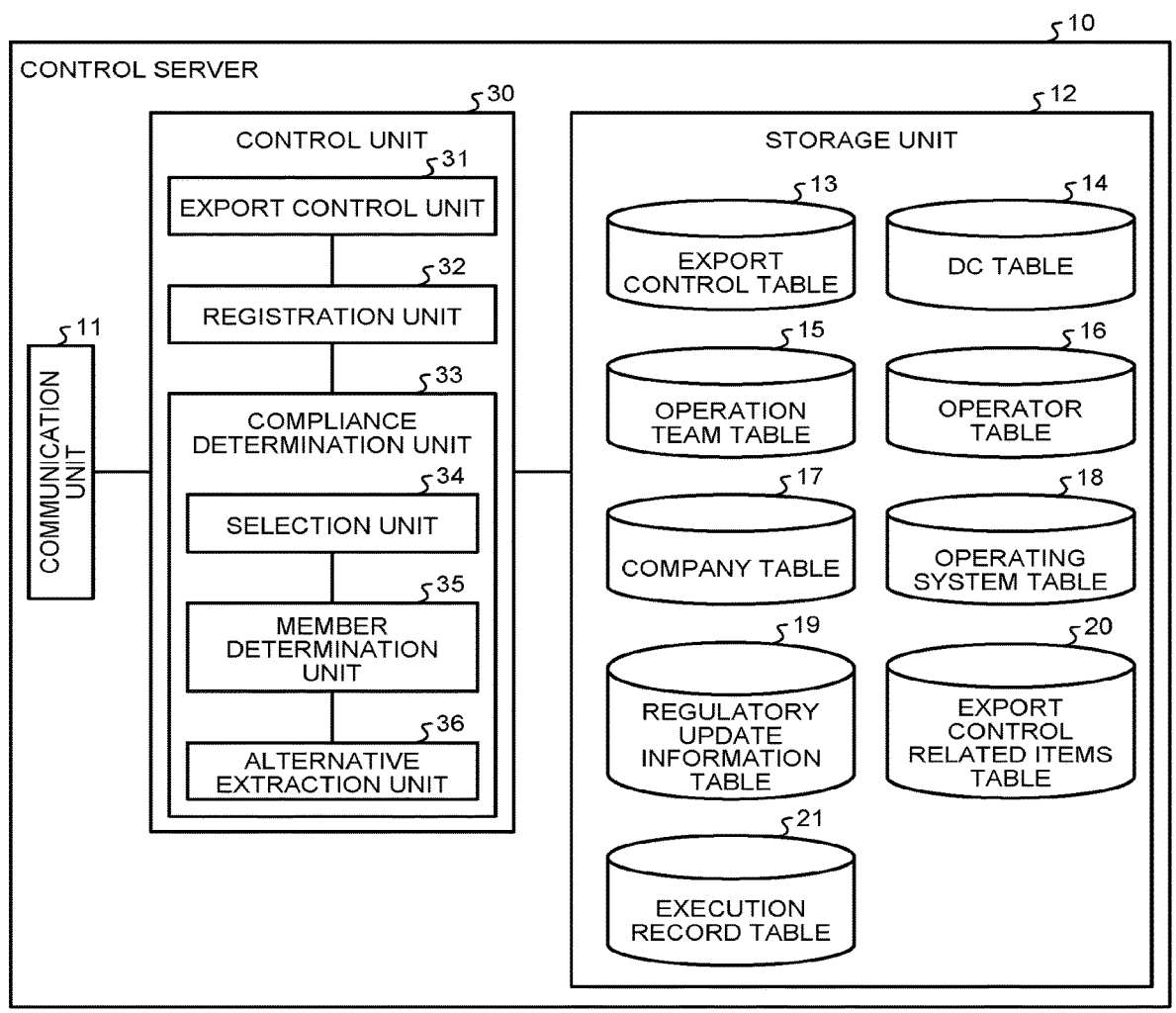
FIG. 2 is a functional block diagram illustrating a functional configuration of a control server according to the first embodiment.

Next, the control server 10 of the control center 1 illustrated in FIG. 1 will be described. FIG. 2 is a functional block diagram illustrating a functional configuration of the control server 10 according to the first embodiment. As illustrated in FIG. 2, the control server 10 includes a communication unit 11, a storage unit 12, and a control unit 30.

The communication unit 11 is a communication interface that controls the communication with other devices, regardless of wired or wireless. For example, the communication unit 11 receives load status from the DCs, and transmits various instructions to the DCs.

The storage unit 12 is a database that stores therein computer programs and data that are executed by the control unit 30. The storage unit 12, for example, is a hard disk or a memory. The storage unit 12 stores therein an export control table 13, a DC table 14, an operation team table 15, an operator table 16, a company table 17, an operating system table 18, a regulatory update information table 19, an export control related items table 20, and an execution record table 21. The tables may be integrally created and managed by the control center 1, or each of the tables may be a virtual table configured so that the information controlled by each data center is acquired via the communication unit 11. The storage unit 12 does not need to actually store the tables in the information storage area, but may store information to tabulate at the time of control.

The export control table 13 records an operation team, when the monitoring operational service (offered service) performed for each of the operating systems by a specific operation team is determined to comply with the export control regulations. The export control table 13 also records the determination date. FIG. 3 is a diagram illustrating an example of information stored in the export control table 13. As illustrated in FIG. 3, the export control table 13 stores therein "team ID, operating system, and determination date" in an associated manner.

In this example, an identifier for identifying the operation team is set in the "team ID", and an identifier for identifying the target system operated by the operation team is set in the "operating system". The date when the monitoring operational service performed by the operation team is determined to comply with the export control regulations is set in the "determination date". The example illustrated in FIG. 3 indicates that a team "G01" that operates an operating system "A01" is determined to comply with the export control regulations on "March 1, 2015".

The DC table 14 stores therein information related to the country where the data center is located. FIG. 4 is a diagram illustrating an example of information stored in the DC table 14. As illustrated in FIG. 4, the DC table 14 stores therein "DC ID, DC name, and location country" in an associated manner. The address information of the data center may also be used as the information of the location country.

In this example, an identifier for identifying the DC is set in the "DC ID", the name of the DC is set in the "DC name", and the name of the country where the DC is located or the like is set in the "location country". The example illustrated in FIG. 4 indicates that the DC name of the DC identified by "DC01" is "Fuji DC", and the "Fuji DC" is located in Japan.

The operation team table 15 stores therein the business hours, the operation team's DC, and the like, for each operation team that operates the system. FIG. 5 is a diagram illustrating an example of information stored in the operation team table 15. As illustrated in FIG. 5, the operation team table 15 stores therein team attribute information such as "team ID, team name, business hours, operation team's DC, and member change date" in an associated manner.

In this example, an identifier for identifying the operation team is set in the "team ID", the name of the operation team is set in the "team name", and the business hours of the operation team is set in the "business hours". Also, the ID of the DC to which the operation team belongs or the like is set in the "operation team's DC", and the latest date when the operator (member) who belongs to the operation team is changed is set in the "member change date". The operation team consists of one or more operators.

The example illustrated in FIG. 5 indicates that the team ID "G01" is assigned to an operation team "Japan A1". Also, FIG. 5 indicates that the "Japan A1" belongs to the "DC01", the business hours are from "9:00 to 17:00", and an operator is changed on "April 1, 2015".

The operator table 16 stores therein information on operators who operate the system. FIG. 6 is a diagram illustrating an example of information stored in the operator table 16. As illustrated in FIG. 6, the operator table 16 stores therein individual attribute information such as "operator ID, name, contact information, operator's team, export control related items (operator's company, having lived in Japan for six or more months, nationality, and the like), export control related items change date, and team change date" in an associated manner.

In this example, an identifier for identifying the operator is set in the "operator ID", the name of the operator is set in the "name", and an email address of the operator, an Internet Protocol (IP) address of the device, or the like is set in the "contact information". An identifier of the operation team to which the operator belongs is set in the "operator's team". Information used for determining the applicability or compliance with the export control regulations is stored in the "export control related items". An identifier for identifying the company to which the operator belongs is set in the "export control related items (operator's company)". Information indicating whether the operator has lived in Japan for six or more months is stored in the "export control related items (having lived in Japan for six or more months)". If the operator has lived in Japan for six or more months, "Yes" is set in the "export control related items (having lived in Japan for six or more months)". If the operator has not lived in Japan for six or more months, "No" is set in the "export control related items (having lived in Japan for six or more months)". The nationality of the operator is set in the "export control related items (nationality). The latest change date when the export control related items, which are controlled by the export control regulations, are changed is set in the "export control related items change date". The latest change date when the operator's team has been changed is set in the "team change date".

The first line in FIG. 6 indicates information on "Taro Tanaka" assigned with "T01". The contact information of the operator "Taro Tanaka" is "tanaka@xx.xx", the team to which "Taro Tanaka" belongs is "G01", and the company of "Taro Tanaka" is "C01". Also, the operator "Taro Tanaka" has lived in Japan for six or more months, and has a Japanese nationality. The latest date when the export control related items are changed for the operator "Taro Tanaka" is "April 1, 2015", and the date when "Taro Tanaka" has joined the current team "G01" is "April 1, 2015".

The company table 17 stores therein information related to the operator's company. FIG. 7 is a diagram illustrating an example of information stored in the company table 17. As illustrated in FIG. 7, the company table 17 stores therein "company ID, company name, and location country" in an associated manner. The address information of the company may also be used as the information of the location country.

In this example, an identifier for identifying the company is set in the "company ID", the name of the company is set in the "company name", and the country where the company is located is set in the "location country". The example illustrated in FIG. 7 indicates that the company ID "C01" is an identifier for a "company X" located in "Japan", and a company ID "C02" is an identifier for a "Japan branch of a company M" located in "Japan".

The operating system table 18 stores therein information on the system being operated by using the DC. FIG. 8 is a diagram illustrating an example of information stored in the operating system table 18. As illustrated in FIG. 8, the operating system table 18 stores therein "system ID, operating system name, DC in use, minimum number of operators" in an associated manner.

In this example, an identifier for identifying the operating system in use is set in the "system ID", and the name of the operating system is set in the "operating system name". An identifier of the DC used by the operating system is set in the "DC in use", and the minimum number of operators for operating the operating system is set in the "minimum number of operators".

The example illustrated in FIG. 8 indicates that the system ID "A01" is assigned to an operating system name "company A", the system is stored in the DC identified with "DC01", and the minimum number of operators are "10".

The regulatory update information table 19 controls the date when the export control regulations are updated. FIG. 9 is a diagram illustrating an example of information stored in the regulatory update information table 19. As illustrated in FIG. 9, the regulatory update information table 19 stores therein "effective date, country, and changed regulation information and the like" in an associated manner.

In this example, the date when the changed export control regulations become effective is set in the "effective date", the name of the country where the export control regulations become effective is set in the "country", and information on the changed regulations and the like is set in the "changed regulation information and the like". The example illustrated in FIG. 9 indicates that the "change in the classification criteria" in the export control regulations in "Japan" has become effective on "May 1, 2012".

The export control related items table 20 stores therein the determination criteria of the export control regulations, for each country. FIG. 10 is a diagram illustrating an example of information stored in the export control related items table 20. As illustrated in FIG. 10, the export control related items table 20 stores therein "country, export control related items, determination criteria, and determination level" in an associated manner.

The export control related items are information items for determining whether an operation service operated by an operator falls under the export in the country, or whether the operation service operated by the operator complies with the export control regulations, based on the export control regulations and laws of each country. The export control related items also indicate the determination criteria corresponding to the export control related items in the operator table 16.

In this example, the name of the country that determines the export control regulations, in other words, the name of the original country of export, is set in the "country". Items relating to the determination of the export control regulations are set in the "export control related items". The criteria for determining the export control regulations are set in the "determination criteria". The determination level of the export control regulations is set in the "determination level". "L1" is set in the "determination level", for the export control related item that is referred to determine whether the operation service operated by the operator "falls under the export". "L2" is set in the "determination level", for the export control related item that is referred to determine "whether the operation service operated by the operator can be exported, when the operation service operated by the operator falls under the export". If L2 is set in the determination level, the determination criteria is referred to determine whether the provision of the operational service complies with the export control regulations, for each operator who provides operational services on the operating system.

The example illustrated in FIG. 10 indicates that in "Japan", a transfer of technology to an operator is not regarded as export, if the operator has "having lived in Japan for six or more months" or if the operator's company is an "office located in Japan". Thus, it is determined that the export control regulations are not applicable to the operation service operated by the operator. Consequently, it is possible to determine that the system operation performed by such an operator does not fall under what is called export without crossing the borders. Also, in Japan, it is possible to determine that a transfer of information to an operator can be exported, if the operator has not "having lived in Japan for six months", the operator's company is not the "office located in Japan", or the operator's company is "not registered in the Foreign User List", unless there is any other reason for noncompliance.

The execution record table 21 stores therein records of determinations made for export control. Processing units such as the control unit 30 and a compliance determination unit 33, which will be described below, record various types of information in the execution record table 21, during the process. FIG. 11 is a diagram illustrating an example of history information stored in the execution record table 21. As illustrated in FIG. 11, the execution record table 21 stores therein "execution date and time, target system, origin of export (country), export destination (country), operation team, list of working operators in the team, and compliance assessment" in an associated manner.

In this example, the date and time is when the monitoring operational service of the operating system performed by the operation team has been referred to in order to determine whether the service does not violate the export control regulations. The date and time are set in the "execution date and time", as reference information. The ID of the system having determined is set in the "target system". The origin of export of the technology information is set in the "origin of export (country)", and the export destination of the technology information is set in the "export destination (country)". The ID of the operation team adopted by the determination is set in the "operation team". The operators who belong to the operation team adopted by the determination as well as the operators who have not been excluded by the determination are set in the "list of working operators in the team". The type of compliance determination being made is set in the "compliance assessment". In this example, "assessed compliance 1" corresponds to a first assessment process, which will be described below, and "assessed compliance 2" corresponds to a second assessment process, which will be described below. By referring to the execution record table 21, for example, if the target system is in the same line as that of the "assessed compliance 1" in the "compliance assessment", the manager or the like can acknowledge that compliance with the export control regulations needs to be determined, due to the change in the export control regulations. The disclosure of predetermined information in the execution record table 21 on a network via the communication unit 11 or in the form of printing provides evidence that the export of remote operations has been suitably controlled.

The second line in FIG. 11 indicates the results when the export decision is made on the system "A01" at "10:00 on January $2^{nd}$, 2015". In making the export decision, the information indicates that as a result that the "assessed compliance 1" is applied, an operation team that does not fall under the export from "Japan" to "Japan" is selected, and the operation team is switched to the operation team "G01" including the operator "Taro Tanaka . . . ". The configurations of the tables described above are not limited to those in the present description, and for example, the information of the "member change date" in the operation team table 15 may also be calculated from the "team change date" by searching the operator table 16. Similarly, instead of the compliance assessment, the execution record table 21 may record information such as "team scheduled to operate", "member change date" of the operation team, "determination date" of the operation team, or "effective date of latest regulations". The example is illustrated in FIG. 12. FIG. 12 is a diagram illustrating another example of history information stored in the execution record table. The "member change date" and the "determination date" are information items referred to, when compliance determination of the operation team is made. In making the export decision, the second line in FIG. 12 indicates that as a result that the "assessed compliance 1" is applied, an operation team that does not fall under the export from "Japan" to "Japan" is selected, and the team "G08" scheduled to operate is changed to the operation team "G01" of Japan. In making the export decision, the third line in FIG. 12 indicates that the "assessed compliance 2" is applied, because the determination date is before the member change date.

The control unit 30 is a processing unit that controls the overall control server 10, and for example, is a processor. The control unit 30 includes an export control unit 31, a registration unit 32, and the compliance determination unit 33. The export control unit 31, the registration unit 32, or the compliance determination unit 33 is an example of an electronic circuit included in the processor and an example of a process executed by the processor.

The export control unit 31 is a processing unit that updates the export control table 13. More specifically, if the manager or the like determines that a combination of the operating system and the operation team complies with the export control regulations, the export control unit 31 stores the combination in the export control table 13. For example, the export control unit 31 receives an input of "team ID, operating system, and determination date" from the manager, and stores the input in the export control table 13.

The registration unit 32 is a processing unit that registers the operation team, the operation member, the DC, and the like. More specifically, upon receiving new information on the operation team and information on the operator who belongs to the operation team from the manager or the like, the registration unit 32 stores the corresponding information in the operation team table 15 and the operator table 16. Also, upon receiving update information on the existing operation team or update information on the operator from the manager or the like, the registration unit 32 updates the operation team table 15 or the operator table 16 with the received information. The registration unit 32 also receives new registration and update information for the DC from the manager or the like, and updates the DC table 14.

The compliance determination unit 33 is a processing unit that determines compliance with the export control regulations. More specifically, the compliance determination unit 33 determines whether the compliance determination of the system operated by the operation team is made based on the latest export control regulations. Also, if the compliance determination of the system is made based on the latest export control regulations, the compliance determination unit 33 determines whether there is a change in the operation team, after the determination is made. The compliance determination unit 33 includes a selection unit 34, a member determination unit 35, and an alternative extraction unit 36.

The selection unit 34 is a processing unit that excludes an operation team that falls under the export, and selects an operation team that does not fall under the export, for the target operating system. This is because, if the export control regulations are updated, export is prohibited without determining the compliance with the updated export control regulations. More specifically, the selection unit 34 excludes the operation team that is not in the same country as that of the data center in which the target operating system is stored, and selects only the members in the operation team that does not fall under the "export without crossing the borders". The process to be described here corresponds to the first assessment process, which will be described below. In the transfer of technology, for example, the "export without crossing the borders" indicates the case that technology is transferred from a resident in Japan to a non-resident of Japan even if the transfer takes place in Japan. The "export without crossing the borders" is to be restricted.

For example, the selection unit 34 executes the first assessment process, when the determination date of the specified team scheduled to operate is before the effective date of the export control regulations corresponding to the country where the specified operating system is located. For example, the selection unit 34 specifies the DC in use "DC01" of the operating system "A01" to be operated from the operating system table 18. Subsequently, the selection unit 34 specifies the location country "Japan" of the DC in use "DC01" from the DC table 14. The selection unit 34 then specifies the DC names "Fuji DC" and "Chubu DC" that are located in the same country as the acquired location country "Japan", from the DC table 14.

The selection unit 34 then specifies the operation team that belongs to the DC name "Fuji DC" or "Chubu DC", by referring to the operation team table 15, and determines the operation team that is eligible to operate the operating system "A01" to be a candidate, by referring to the export control table 13. Furthermore, the selection unit 34 selects an operation team that is eligible to operate the operating system, so as not to fall under the "export without crossing the borders", from the operation teams determined to be the candidates.

An example when one of the candidates is "G01" will now be described. By referring to the operator table 16, the selection unit 34 selects an operator who belongs to the team "G01". The selection unit 34 then extracts the export control related items including the "operator's company (C01), having lived in Japan for six or more months (YES), and nationality (Japan)" of "Taro Tanaka" who belongs to the team "G01", from the operator table 16.

Then, the selection unit 34 makes comparison between the export control related items of "Taro Tanaka" and the information on regulations corresponding to "Japan" where the DC is located, and determines whether the operation performed by "Taro Tanaka" falls under the "export without crossing the borders".

For example, the selection unit 34 reads out the "export control related items", the "determination criteria", and the "determination level" corresponding to "Japan" where the DC is located, from the export control related items table 20. The selection unit 34 then specifies that "Taro Tanaka", who is a target, has lived in Japan for six or more months, and the country where "Taro Tanaka's company (C01)" is located is in "Japan", by referring to the company table 17. The selection unit 34 then determines that "Taro Tanaka", who is a target, is a resident in Japan, because one or more determination criteria illustrated in the first and second lines in FIG. 10 are satisfied. As a result, the selection unit 34 selects "Taro Tanaka" as an operator, by determining that the system operation performed by "Taro Tanaka" does not fall under the "export without crossing the borders".

On the other hand, for example, if "Taro Tanaka", who is a target, does not satisfy both determination criteria illustrated in the first and second lines in FIG. 10, the selection unit 34 determines that "Taro Tanaka" is not a resident in Japan. In this case, the selection unit 34 determines that the system operation performed by "Taro Tanaka" falls under the "export without crossing the borders", and exclude "Taro Tanaka" from the operator.

The selection unit 34 executes the above process on each operator who belongs to the operation team specified as the operation candidate, and determines whether the each operation service operated by each operator falls under the "export without crossing the borders". Then, if the number of operators determined not to fall under the "export without crossing the borders" is equal to or more than the "minimum number of operators" in the operating system table 18, the selection unit 34 determines the candidate operation team being processed to be the operation team. If the number of operators determined not to fall under the "export without crossing the borders" is less than the "minimum number of operators" in the operating system table 18, the selection unit 34 executes the similar process on the next candidate. The selection unit 34 can also store the determination results obtained from the above process in the execution record table 21.

The member determination unit 35 is a processing unit that determines whether compliance determination of the operator (member) who belongs to the specified team scheduled to operate has been made. More specifically, if the member change date of the specified team scheduled to operate is after the determination date of the specified team scheduled to operate of the specified operating system, the member determination unit 35 excludes the member who is added after the determination date, from the members in the team scheduled to operate. This process corresponds to the second assessment process, which will be described below.

For example, an example of when the target country is "Japan" and the team scheduled to operate is "G01" will now be described. The member determination unit 35 specifies that the compliance determination date of the team "G01" scheduled to operate is on "March 1, 2015" from the export control table 13, and the member change date of the team "G01" scheduled to operate is on "April 1, 2015" from the operation team table 15.

The member determination unit 35 then specifies an operator who belongs to the operation team "G01", and whose team change date is after the determination date of the team, from the operator table 16. For example, the team change date of the operator "Taro Tanaka" is on "April 1, 2015", and the "April 1, 2015" is after the determination date of "March 1, 2015". Thus, the operator "Taro Tanaka" is excluded from the operator. Because the operator "Taro Tanaka" is an operator added after the determination date, even if the determination on the export control regulations has been made for the operation team, the determination is not yet made for the operator "Taro Tanaka" as an individual.

In this manner, the member determination unit 35 selects the operator, by making comparison between the "team change date" of each operator who belongs to the team scheduled to operate, and the determination date of the team scheduled to operate. Then, if the number of operators determined to be the operator is equal to or more than the "minimum number of operators", the member determination unit 35 determines the team scheduled to operate being processed to be the operation team. If the number of operators determined to be the operator is less than the "minimum number of operators", the member determination unit 35 instructs the alternative extraction unit 36 to start processing. The member determination unit 35 may also store the determination results obtained from the above process in the execution record table 21.

The alternative extraction unit 36 is a processing unit that selects an alternative team for the team scheduled to operate. More specifically, upon receiving an instruction to start processing from the member determination unit 35, the alternative extraction unit 36 acquires the ID (such as A01) of the target operating system and the ID (such as G01) of the team scheduled to operate with the number of operators less than the "minimum number of operators", from the member determination unit 35.

The alternative extraction unit 36 then extracts the team ID corresponding to the acquired ID of the operating system, from the export control table 13. In this example, the alternative extraction unit 36 outputs and displays the team ID excluding the ID of the team scheduled to operate in which the number of operators is less than the "minimum number of operators", among the extracted team IDs, on the output destination such as a display. The alternative extraction unit 36 then makes the manager or the like to select one of the team IDs therefrom. Subsequently, the alternative extraction unit 36 selects the operation team corresponding to the selected team ID, as the operation team for the operating system.

The alternative extraction unit 36 can also select the operation team the member change date of which is after the effective date of the export control regulations, when extracting an alternative team scheduled to operate. Also, the alternative extraction unit 36 can store the results obtained from the above process in the execution record table 21.

Processing Flow

Figure 13:
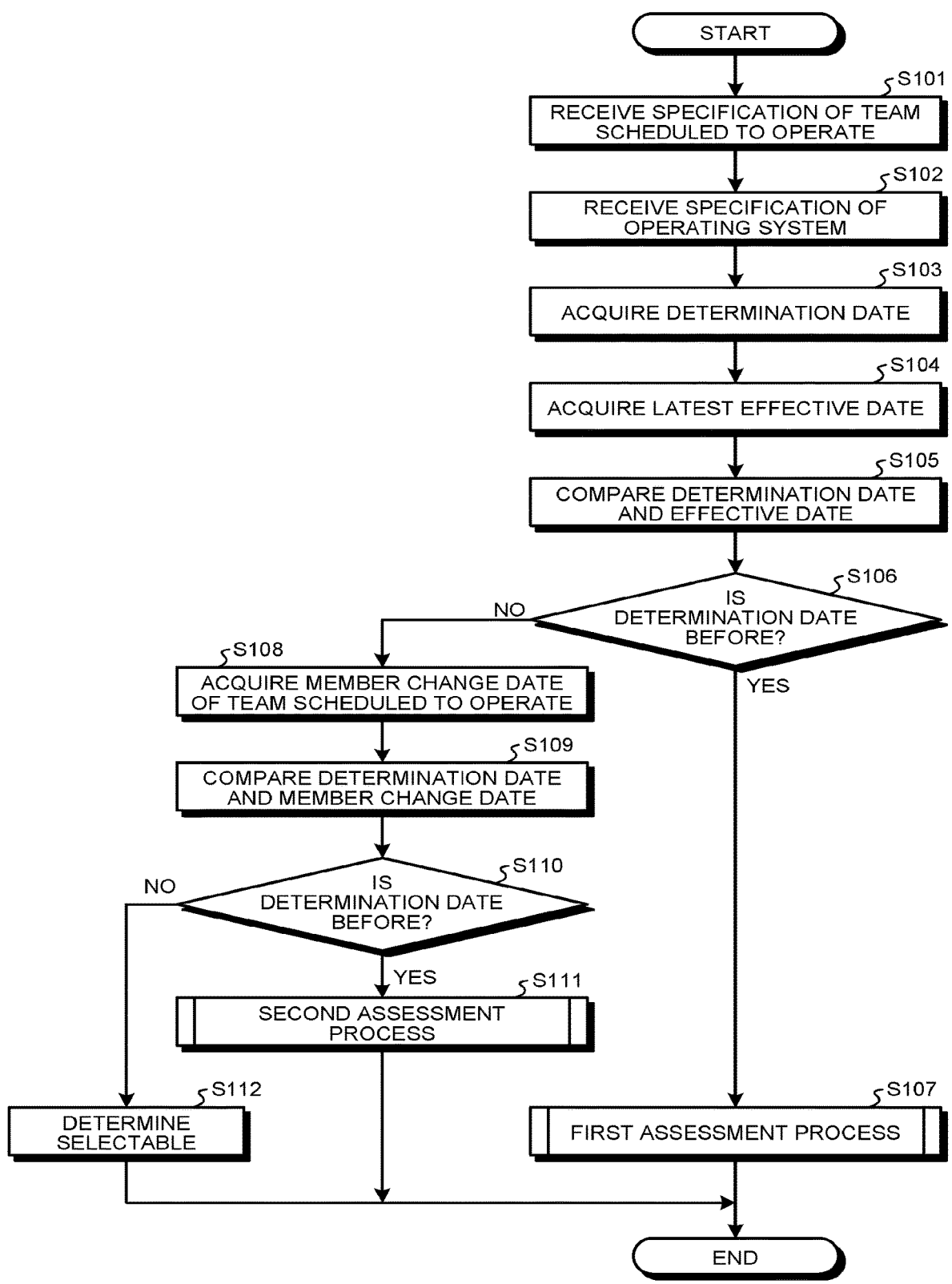
FIG. 13 is a flowchart illustrating a flow of a compliance determination process.

A flow of the compliance determination process described above will now be explained. FIG. 13 is a flowchart illustrating the flow of the compliance determination process. As illustrated in FIG. 13, the compliance determination unit 33 receives the specification of the team scheduled to operate and the specification of the operating system, from the manager or the like (S101 and S102).

Next, the compliance determination unit 33 acquires the "determination date" corresponding to the pair of the specified team scheduled to operate and operating system, by referring to the export control table 13 and the like (S103). The compliance determination unit 33 also acquires the latest "effective date" of the "location country" of the operating system, by referring to the regulatory update information table 19 and the operating system table 18 (S104). The acquisition of the latest "effective date" is not limited to the above, and the latest "effective date" may also be received by an input from the manager.

The compliance determination unit 33 then makes comparison between the "determination date" of the team scheduled to operate and the latest "effective date" (S105). If the "determination date" is before the "effective date" (Yes at S106), the first assessment process will be executed (S107).

If the "determination date" and the "effective date" are on the same day or if the "determination date" is after the "effective data" (No at S106), the compliance determination unit 33 acquires the "member change date" of the team scheduled to operate, by referring to the operation team table 15 (S108).

The compliance determination unit 33 then makes comparison between the "determination date" and the "member change date" of the team scheduled to operate (S109). If the "determination date" is before the "member change date" (Yes at S110), the second assessment process will be executed (S111).

If the "determination date" and the "member change date" are on the same day or if the "determination date" is after the "member change date" (No at S110), the compliance determination unit 33 determines that the team scheduled to operate is selectable (S112). In other words, the compliance determination unit 33 determines the team scheduled to operate to be the team that is in charge of operating the specified operating system.

First Assessment Process

Figure 14:
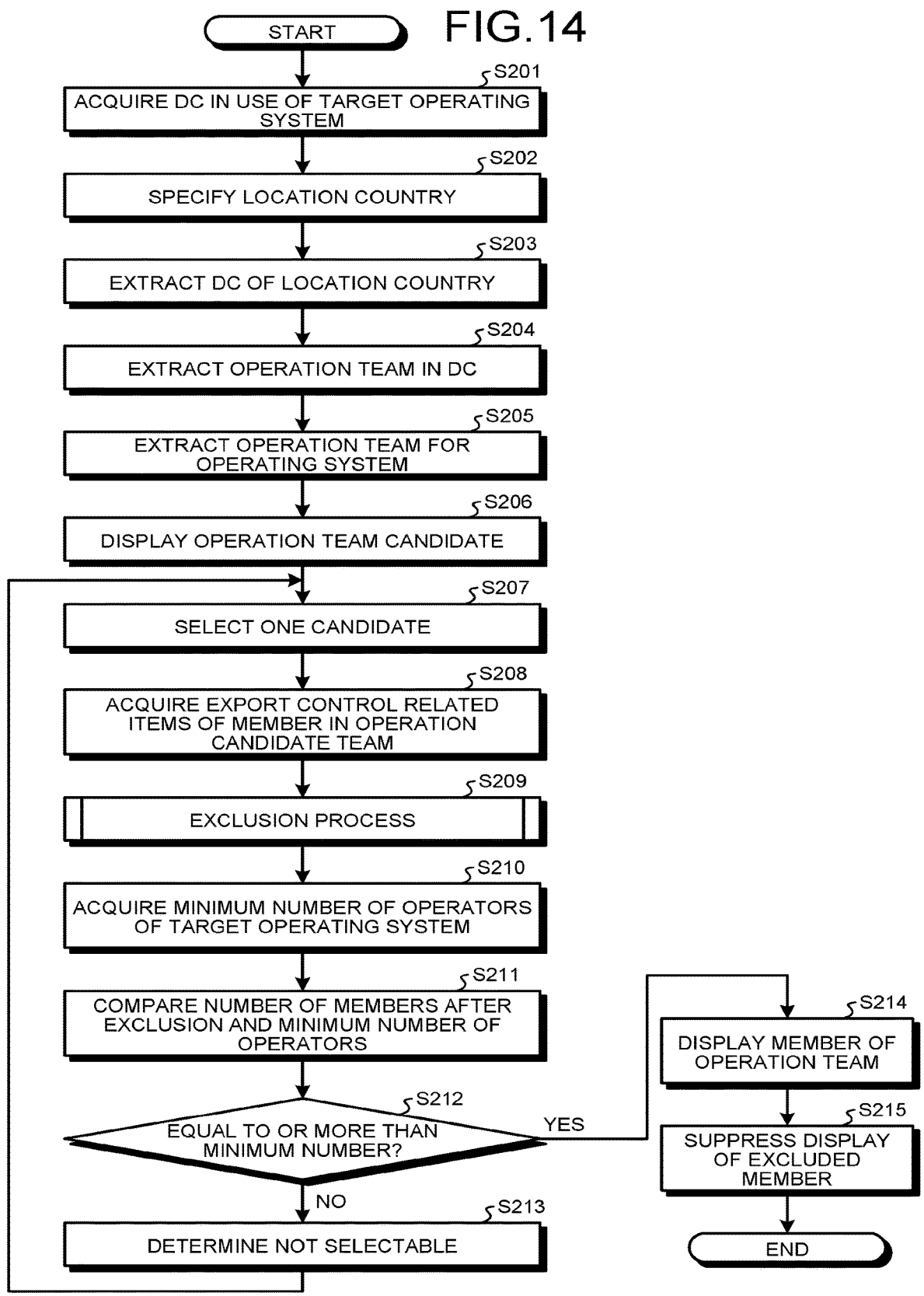
FIG. 14 is a flowchart illustrating a flow of a first assessment process.

Next, the first assessment process executed at S107 in FIG. 13 will be described. FIG. 14 is a flowchart illustrating the flow of the first assessment process.

As illustrated in FIG. 14, the selection unit 34 acquires the "DC in use" of the target operating system, in other words, the operating system specified by the manager, from the operating system table 18 (S201). Next, the selection unit 34 specifies the "location country" corresponding to the "DC in use" acquired at S201, by referring to the DC table 14 (S202).

Furthermore, the selection unit 34 extracts the DC corresponding to the location country that is the same as the specified "location country", by referring to the DC table 14 (S203). Then, the selection unit 34 extracts the operation team that belongs to the DC extracted at S203, from the operation team table 15 (S204). Subsequently, the selection unit 34 extracts only the operation team that is registered as a pair with the target operating system, from the operation team extracted at S204, by referring to the export control table 13 and the like (S205).

Furthermore, the selection unit 34 outputs and displays the operation team selected at S205 as a candidate, on a display and the like (S206). The selection unit 34 then selects one candidate (operation candidate team) from the candidates being displayed (S207). The selection unit 34 can also receive the selection from the manager or the like, or select an optional candidate.

Next, the selection unit 34 acquires the "export control related items" of the member (operator) who belongs to the operation candidate team, by referring to the operator table 16 (S208). At this time, the selection unit 34 acquires the "export control related items" for each member. Then, the selection unit 34 executes an exclusion process of a member, by using the acquired "export control related items" (S209).

Upon finishing the exclusion process, the selection unit 34 acquires the "minimum number of operators" of the target operating system, by referring to the operating system table 18 (S210). The selection unit 34 then makes comparison between the number of members of the operation candidate team after the exclusion process is performed, and the "minimum number of operators" (S211). If the number of members is less than the minimum number of operators (No at S212), the selection unit 34 determines that the operation candidate team is not selectable (S213), and repeats the process from S207. In other words, if the remaining number of members who have not been excluded is less than a threshold, the selection unit 34 determines that the operation candidate team is the team not eligible to operate, and performs the similar process on the next operation candidate team.

If the number of members after the exclusion process is performed is equal to or more than the minimum number of operators (Yes at S212), the selection unit 34 determines the operation candidate team to be the operation team, and outputs and displays the members of the operation team on a display and the like (S214). Then, the selection unit 34 suppresses the display of the member who has been excluded by the exclusion process (S215). For example, the selection unit 34 cuts the computer of the excluded member off from the network, or displays a message indicating that the member is excluded on the computer of the excluded member.

Exclusion Process

Figure 15:
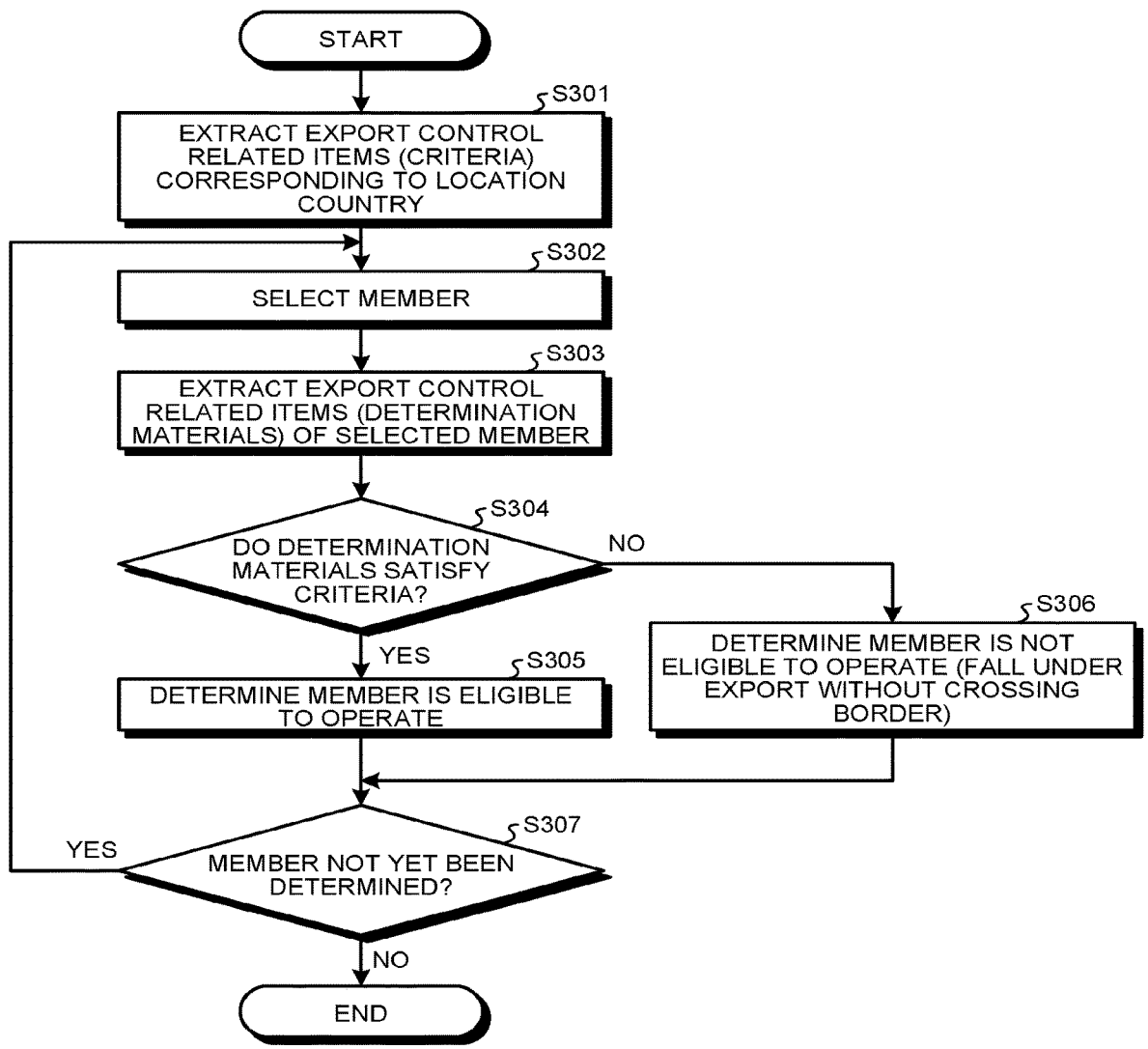
FIG. 15 is a flowchart illustrating a flow of an exclusion process.

The exclusion process executed at S209 in FIG. 14 will now be described. FIG. 15 is a flowchart illustrating the flow of the exclusion process.

As illustrated in FIG. 15, the selection unit 34 extracts the export control related items corresponding to the location country of the target operating system, as well as the export control related items with the determination level of L1, from the export control related items table 20 (S301). The information extracted at S301 is referred to as "criteria".

The selection unit 34 then selects a member who belongs to the operation candidate team (S302), and acquires the export control related items of the selected member from the operator table 16 (S303). The information acquired at S303 is referred to as "determination materials". The items corresponding to the "criteria" described above are used as the "determination materials".

If the determination materials satisfy the criteria (Yes at S304), the selection unit 34 determines that the selected member is eligible to operate (S305). In other words, the selection unit 34 selects the member as the operation member. The determination materials, for example, include "having lived in Japan for six or more months".

If the determination materials do not satisfy the criteria (No at S304), the selection unit 34 determines that the selected member is not eligible to operate (S306). In other words, the selection unit 34 identifies that the member falls under the "export without crossing the borders", and exclude the member from the operation member.

After S305 or S306 is performed, the selection unit 34 repeats from S302, if there is a member who has not yet been determined (Yes at S307). If all the members have been determined (No at S307), the selection unit 34 finishes the exclusion process, and returns to the first assessment process.

Second Assessment Process

Figure 16:
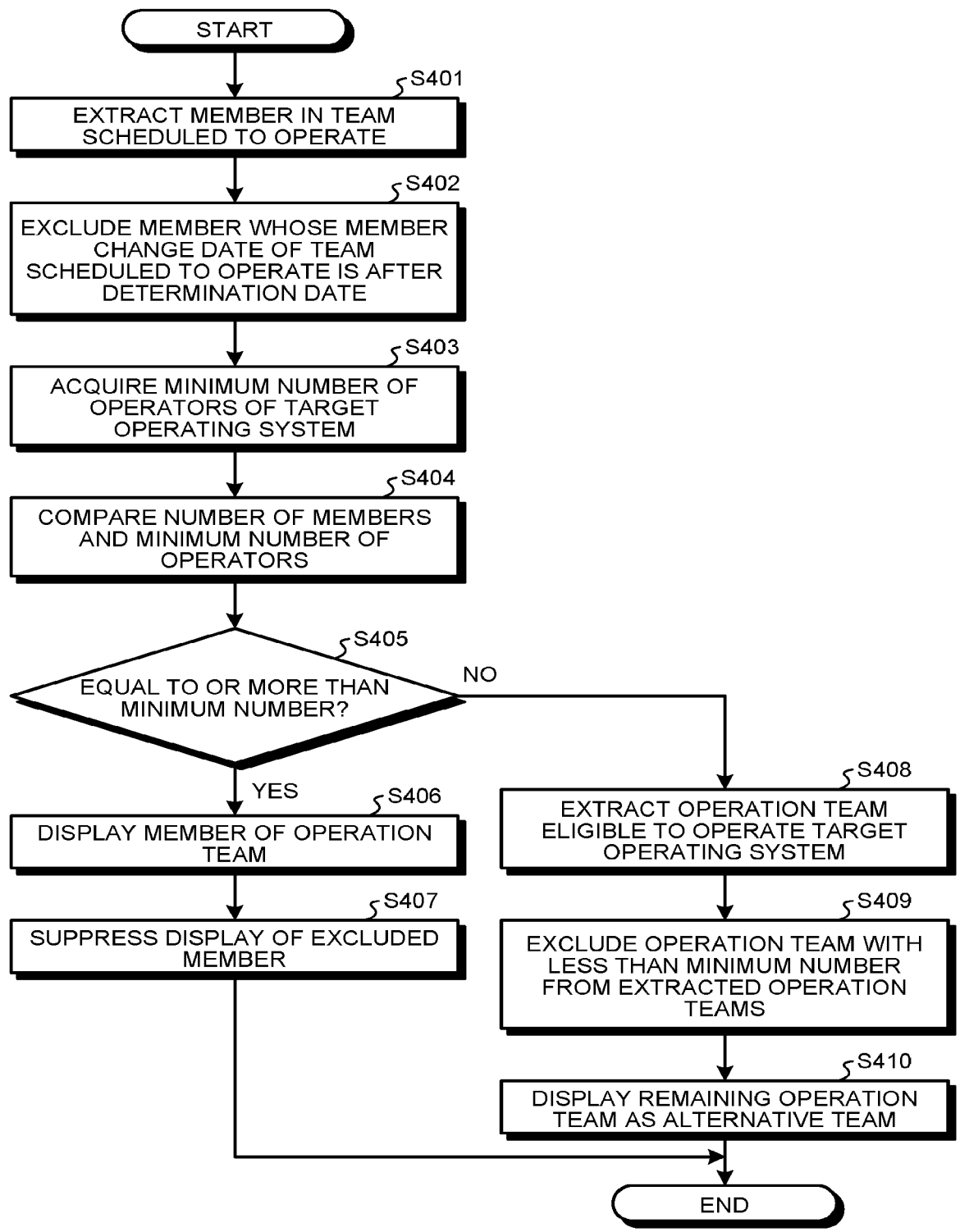
FIG. 16 is a flowchart illustrating a flow of a second assessment process.

Next, the second assessment process executed at S111 in FIG. 13 will be described. FIG. 16 is a flowchart illustrating the flow of the second assessment process.

As illustrated in FIG. 16, the member determination unit 35 extracts a member (operator) who belongs to the team scheduled to operate, by referring to the operator table 16 (S401). Next, the member determination unit 35 acquires the "determination date" of the team scheduled to operate corresponding to the target system to be operated, from the export control table 13, and the "team change date" of each member from the operator table 16. The member determination unit 35 then excludes a member whose "team change date" is after the "determination date" (S402).

The member determination unit 35 then acquires the "minimum number of operators" of the target operating system, by referring to the operating system table 18 (S403). Subsequently, the member determination unit 35 makes comparison between the remaining "number of members" of the team scheduled to operate excluding the excluded members, and the "minimum number of operators" (S404). If the number of members is equal to or more than the minimum number of operators (Yes at S405), the member determination unit 35 determines the team scheduled to operate to be the operation team, and outputs and displays the member of the operation team on the output destination such as a display and the like (S406). Consequently, the member determination unit 35 suppresses the display of the member who has been excluded by the exclusion process (S407).

If the number of members is less than the minimum number of operators (No at S405), the alternative extraction unit 36 extracts an operation team eligible to operate the target operating system, by referring to the export control table 13 (S408). In other words, the alternative extraction unit 36 extracts the operation team corresponding to the target operating system.

Next, the alternative extraction unit 36 excludes the operation team having the number of members determined to be less than the minimum number of operators at S405, from the at least one operation team extracted at S408 (S409). Then, the alternative extraction unit 36 outputs and displays the remaining operation team after being excluded at S409, as an alternative team on the output destination such as a display and the like (S410). The manager or the like determines the operation team by returning to the compliance determination process again, based on the information on the displayed alternative team.

Registration Change Process

Figure 17:
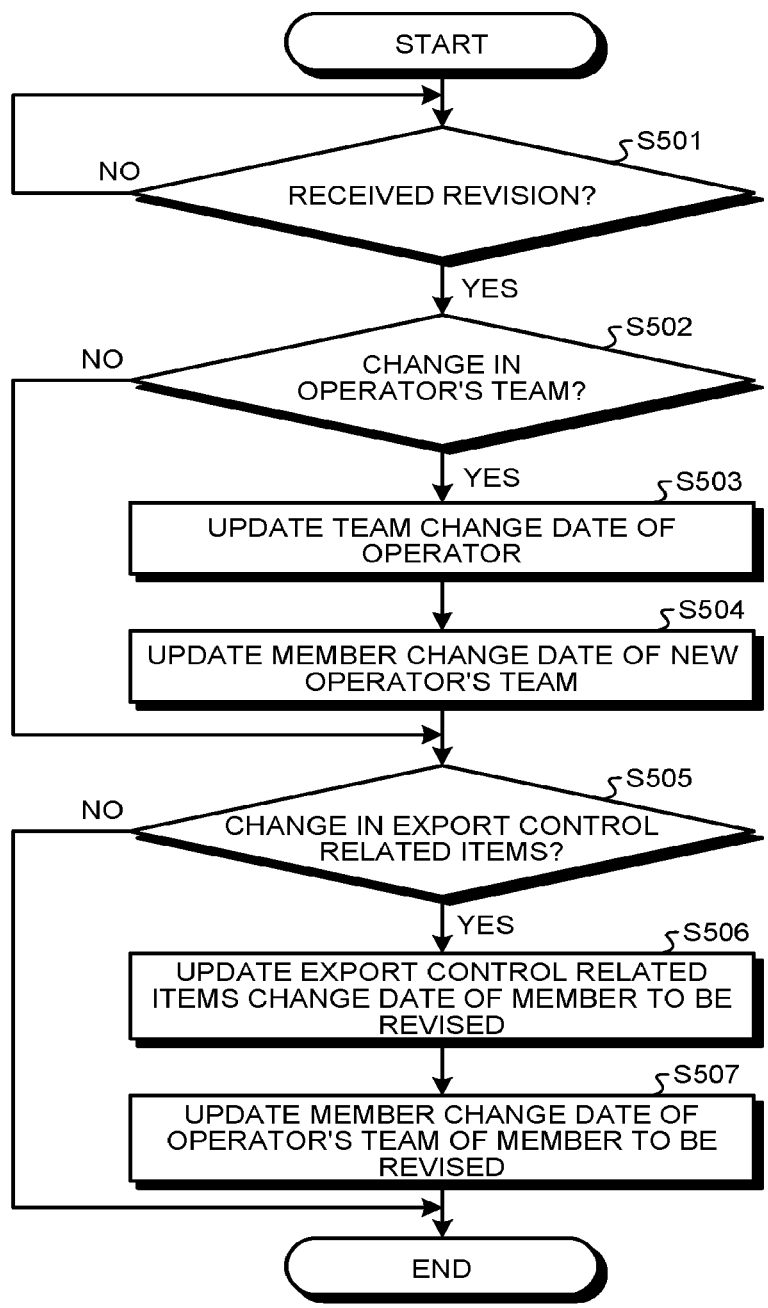
FIG. 17 is a flowchart illustrating a flow of a change process of operator information.

Next, a registration change process of the member in the operation team will be described. FIG. 17 is a flowchart illustrating the flow of the change process of the operator information. As illustrated in FIG. 17, upon receiving a revision (Yes at S501), the registration unit 32 determines whether the revision includes a change in the operator's team in the operator table 16 (S502).

If the revision includes a change in the operator's team (Yes at S502), the registration unit 32 updates the "team change date" of the corresponding operator in the operator table 16 (S503). Next, the registration unit 32 updates the "member change date" of the new team to which the changed operator belongs, in the operation team table 15 (S504). At S504, it is also possible to simultaneously notify the manager of the member change of the operation team, via an email and the like.

If the revision includes a change in the export control related items (Yes at S505), the registration unit 32 updates the "export control related items change date" of the corresponding operator in the operator table 16 (S506). At S506, it is also possible to simultaneously notify the manager of the change in the export control related items of the operation team member, via an email and the like. Subsequently, the registration unit 32 updates the "member change date" of the operator's team to which the changed operator belongs, in the operation team table 15 (S507).

If the revision does not include a change in the operator's team (No at S502), or a change in the export control related items (No at S505), the registration unit 32 finishes the process.

Advantageous Effects

As described above, the control server 10 can determine the operation team that complies with the export control regulations corresponding to the country of the DC in which the operating system is operated, when the destination of remote operation of the customer's operating system is to be determined. Thus, the operation team that complies with the export control regulations can remotely operate the customer systems.

The control server 10 can detect the operation team that has not yet made the compliance determination with respect to the changed export control regulations, when the export control regulations of each country are changed (updated). Thus, it is possible to control the export of remote operations, following the change in the export control regulations.

The control server 10 can also specify the member who has not yet made the compliance determination with respect to the export control regulations, among the operation team members, and exclude the member from the operation team. Thus, it is possible to perform export control on each operator.

The control server 10 can also determine an alternative operation team, if the number of operators that comply with the export control regulations in the operation team is less than the minimum number of operators. Thus, it is possible to suppress the influence on the operating system and continue operating the system.

For example, in recent years, an international framework (national export control regimes) has been established to prevent weapons as well as goods and technologies with possible military applications from reaching countries that threaten the security of our country and international community, and terrorists and other entities of concern. Exports are controlled in coordination with the international community. In Japan, the export of technology is controlled by the list control and catchall control. The control server 10 can comply with the challenges of the international community, in transferring of technology such as the remote operation.

[b] Second Embodiment

While the embodiment of the present invention has been described above, the present invention is not limited to the above-described embodiment, and various modifications may be made.

Determination for Each Operator

In the examples of the embodiment described above, the determination is made for each operation team. However, it is not limited thereto, and the determination may be made for each operator. For example, a single operator may be conveniently registered as a team, and the minimum number of operators in the operating system table 18 may all be set to one. In this manner, when an operation team for a certain customer system is to be determined, the control server 10 can select an operator whose determination date is after the effective date of the export control regulations corresponding to the location country of the customer system, regardless of the operator's team.

System

The components of the devices illustrated in the drawings does not need to be physically configured as illustrated in the drawings. That is, the components can be dispersed or integrated in an optional unit. Furthermore, all or any desired part of the processing functions implemented by each device can be provided by a central processing unit (CPU) or a computer program analyzed and executed by the CPU, or can be provided as hardware by the wired logic.

Of the processes described in the present embodiments, all or a part of the processes described as being automatically performed may be manually performed, or all or a part of the processes described as being manually performed may be automatically performed with a known method. For example, it is also possible to configure the components so that the control unit 30 includes a storage control unit and the like by which proceedings of the processing performed by the processing units such as the control unit 30 and the compliance determination unit 33, which will be described below, are recorded in the execution record table 21. Also, the processing procedure, the controlling procedure, specific names, and information including various types of data and parameters disclosed in the specification described above or in the drawings can be optionally changed, unless otherwise specified.

Hardware

Figure 18:
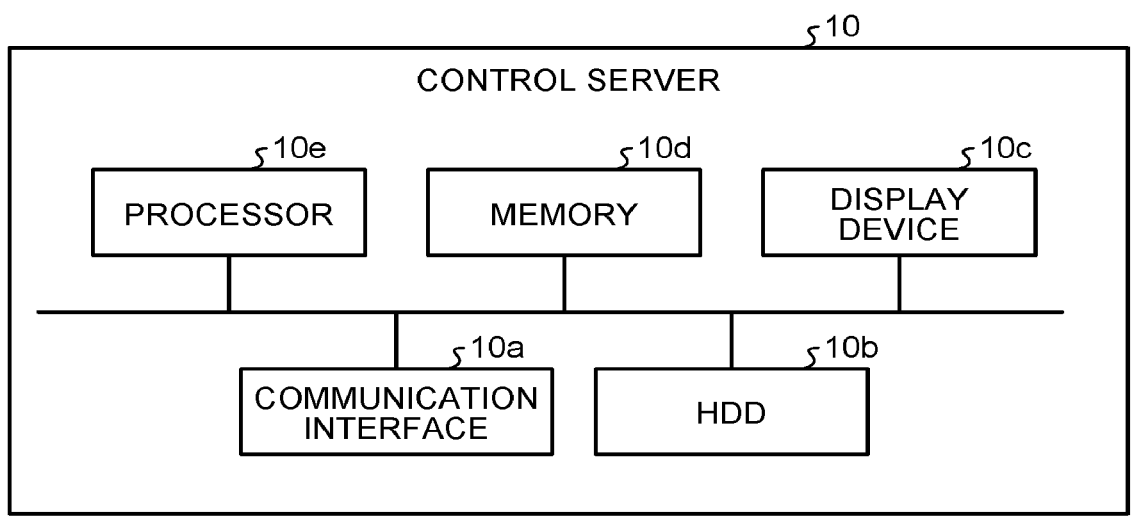
FIG. 18 is a diagram illustrating an example of a hardware configuration.

FIG. 18 is a diagram illustrating an example of a hardware configuration. As illustrated in FIG. 18, the control server 10 includes a communication interface 10a, a hard disk drive (HDD) 10b, a display device 10c, a memory 10d, and a processor 10e. The units illustrated in FIG. 18 are connected to each other via a bus and the like.

The communication interface 10a is an interface that controls communication with the other device, and for example, a network interface card. The HDD 10b stores therein computer programs and DB to operate the functions illustrated in FIG. 2 and the like. The display device 10c is a device that displays various types of information such as candidates for team scheduled to operate and operation team in the processes described above. The display device 10c, for example, is a display and a touch panel.

The processor 10e reads out the computer programs that execute the same processes as those of the processing units illustrated in FIG. 2 and the like, from the HDD 10b and the like, and loads them on the memory 10d. In this manner, the processor 10e operates the process for executing the functions described in FIG. 2 and the like.

In other words, this process executes the same function as that of each processing unit included in the control server 10. More specifically, the processor 10e reads out the computer programs having the same functions as those of the export control unit 31, the registration unit 32, and the compliance determination unit 33, from the HDD 10b and the like. Then, the processor 10e executes the same processes as those of the export control unit 31, the registration unit 32, and the compliance determination unit 33.

In this manner, the control server 10 operates as an information processing device that executes the control method, by reading out the computer programs. The control server 10 can also implement the same functions as those of the above embodiments, by reading out the computer programs from the recording medium using a medium reading device, and executing the read out computer programs. The computer programs referred to in this alternative embodiment are not limited to being executed by the control server 10. For example, the present invention can be similarly applied, when the computer programs are executed by the other computer or server, or when the computer and server execute the computer programs in cooperation.

According to the embodiment, it is possible to control the export of remote operations.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control server device comprising:
a memory that stores therein operator information related to a plurality of operators who provide an operational service on an operating system wherein the operator information includes information that is used for compliance determination with respect to an export control regulation, for each of the plurality of operators, including nationality thereof and location country information that indicates a country where an operating system is located; and
a processor that is connected to the memory, wherein the processor executes a process including:
receiving specification of an operating system from a user;
identifying a country where the specified operating system is located, based on the location country information;
identifying a team that provides an operational service on the specified operating system, the team being located in the identified country, based on control information that is stored in the memory and includes information of a team that provides an operational service on an operating system;
determining whether an export control regulation corresponding to the identified country applies to an operator among operators belonging to the identified team, based on the operator information;
excluding the operator when the export control regulation is determined to apply thereto from the identified team;
selecting the identified team that does not include the excluded operator as a team that provides an operational service on the specified operating system;
outputting the selected team to an output device; and
controlling an access of a computer of the selected operator to network such that the computer of the selected operator can remotely provide the operational service on the specified operating system via the network, and cutting a computer of an operator to whom an export control regulation is applied off from the network.

2. The control server device according to claim 1, wherein the operator information includes attribute information on each of the plurality of operators, and/or attribute information on a team including one or a plurality of operators.

3. The control server device according to claim 1, wherein
the memory further stores therein control information including a determination date associated with a team including a plurality of operators, the determination date being a date when it is determined that provision of the operational service on the operating system by the team complies with the export control regulation, and
the selecting includes selecting an operator in a specified team who provides the operational service, based on the determination date of the team and a latest effective date of the export control regulation.

4. The control server device according to claim 3, wherein the selecting includes selecting an operation team in a same country as that of the operating system, when the determination date of the team is before the latest effective date.

5. The control server device according to claim 4, wherein the selecting includes further selecting an operator who does not fall under the export control regulation, out of the operators in the operation team in the same country.

6. The control server device according to claim 3, wherein the selecting includes excepting an operator in the specified team when the latest effective date is before the determination date of the specified team and a date at which the operator is added to the specified team is after the determination date of the specified team.

7. The control server device according to claim 3, wherein the selecting includes determining that the specified team is not selectable, when number of operators who belong to the specified team does not satisfy a threshold.

8. The control server device according to claim 3, wherein the process further includes storing at least one of reference information indicating that the determination date stored in the memory corresponding to an operator who is to provide the operational service is confirmed, and change information indicating that an operator who is to provide the operational service on the operating system has been replaced by an operator who does not fall under the export control regulation when the determination date is before the latest effective date, in the memory.

9. A control method for a control server device, the method comprising:
referring to a memory that stores therein operator information related to a plurality of operators who provide an operational service on an operating system wherein the operator information includes information that is used for compliance determination with respect to an export control regulation, for each of the plurality of operators, including nationality thereof and location country information that indicates a country where an operating system is located, using a processor;
receiving specification of an operating system from a user, using the processor;
identifying a country where the specified operating system is located, based on the location country information, using the processor;
identifying a team that provides an operational service on the specified operating system, the team being located in the identified country, based on control information that is stored in the memory and includes information of a team that provides an operational service on an operating system, using the processor;

determining, using the processor, whether an export control regulation corresponding to the identified country applies to an operator among operators belonging to the identified team, based on the operator information;

excluding the operator when the export control regulation is determined to apply thereto from the identified team;

selecting, using the processor, the identified team that does not include the excluded operator as a team that provides an operational service on the specified operating system;

outputting the selected team to an output device; and controlling an access of a computer of the selected operator to network such that the computer of the selected operator can remotely provide the operational service on the specified operating system via the network, and cutting a computer of an operator to whom an export control regulation is applied off from the network.

10. A non-transitory computer-readable recording medium having stored therein a program that causes a control server device to execute a process comprising:

referring to a memory that stores therein operator information related to a plurality of operators who provide an operational service on an operating system wherein the operator information includes information that is used for compliance determination with respect to an export control regulation, for each of the plurality of operators, including nationality thereof and location country information that indicates a country where an operating system is located;

receiving specification of an operating system from a user;

identifying a country where the specified operating system is located, based on the location country information;

identifying a team that provides an operational service on the specified operating system, the team being located in the identified country, based on control information that is stored in the memory and includes information of a team that provides an operational service on an operating system;

determining whether an export control regulation corresponding to the identified country applies to an operator among operators belonging to the identified team, based on the operator information;

excluding the operator when the export control regulation is determined to apply thereto from the identified team;

selecting the identified team that does not include the excluded operator as a team that provides an operational service on the specified operating system;

outputting the selected team to an output device; and controlling an access of a computer of the selected operator to network such that the computer of the selected operator can remotely provide the operational service on the specified operating system via the network, and cutting a computer of an operator to whom an export control regulation is applied off from the network.

* * * * *